United States Patent [19]
Kingsbury

[11] Patent Number: 5,523,030
[45] Date of Patent: Jun. 4, 1996

[54] METHOD OF MAKING A MOULDED PHOTOCHROMIC LENS

[75] Inventor: Jeffrey M. Kingsbury, Cotati, Calif.

[73] Assignee: Sola International Inc., Menlo Park, Calif.

[21] Appl. No.: 208,235

[22] Filed: Mar. 10, 1994

Related U.S. Application Data

[62] Division of Ser. No. 49,798, Apr. 21, 1993, Pat. No. 5,405,557.

[51] Int. Cl.$^6$ .................................... B29D 11/00
[52] U.S. Cl. .................. 264/1.700; 264/2.2; 264/328.7; 264/328.8
[58] Field of Search ................ 264/1.7, 1.8, 245, 264/2.2, 2.3, 328.7, 328.8; 425/808

[56] References Cited

U.S. PATENT DOCUMENTS

| | | | |
|---|---|---|---|
| 2,635,289 | 4/1953 | Owens | 264/1.7 |
| 3,363,039 | 1/1963 | Nagai et al. | 264/245 |
| 3,716,489 | 2/1973 | DeLapp | 264/1.7 |
| 3,822,107 | 7/1974 | Wogerer | 264/245 |
| 4,076,788 | 2/1978 | Ditto . | |
| 4,657,354 | 4/1987 | Kobayashi | 264/1.7 |
| 4,758,448 | 7/1988 | Sandvig et al. . | |
| 4,836,960 | 6/1989 | Spector et al. | 425/808 |
| 4,873,029 | 10/1989 | Blum | 264/1.8 |
| 4,919,850 | 4/1990 | Blum et al. | 264/1.7 |
| 5,084,223 | 1/1992 | Morita et al. | 264/1.7 |
| 5,147,585 | 9/1992 | Blum | 264/1.8 |
| 5,219,497 | 6/1993 | Blum | 264/1.7 |
| B1 4,758,448 | 1/1994 | Sandvig et al. . | |

FOREIGN PATENT DOCUMENTS

| | | | |
|---|---|---|---|
| 735781 | 6/1966 | Canada | 264/245 |
| 0476228 | 3/1992 | European Pat. Off. . | |
| 488627 | 6/1992 | European Pat. Off. | 264/1.8 |
| 3622871 | 2/1987 | Germany . | |
| 4220251 | 1/1993 | Germany . | |
| WO89/02818 | 4/1989 | WIPO . | |

*Primary Examiner*—Mathieu D. Vargot
*Attorney, Agent, or Firm*—Howrey & Simon

[57] ABSTRACT

A lens has two or more layered sections of thermoplastic material, and a substantially homogenous formation in which at least one of the layered sections has an active photochromic material present. The article is made by: forming a mould cavity from first and second mould halves; loading the mould cavity with a first thermoplastic material; curing or partially curing that material; changing the second mould half to define a subsequent mould cavity in which the cured or partially cured material is present; loading the subsequent mould cavity with a subsequent thermoplastic material; and completing any uncompleted curing of the first and subsequent thermoplastic materials. At least one of the thermoplastic materials is loaded with an active photochromic material.

6 Claims, 6 Drawing Sheets

METHOD OF MAKING A MOULDED PHOTOCHROMIC LENS

This application is a division of application Ser. No. 08/049,798, filed on Apr. 21, 1993, now U.S. Pat. No. 5,405,557.

FIELD OF INVENTION

This invention relates to a method of moulding articles, such as spectacle lenses, and, in particular, to a method of moulding an article which is formed from two or more layered sections but which has a substantially homogenous formation.

BACKGROUND

Over the last 20 to 40 years there has been a significant increase in the usage of polymeric materials in the lives of people. Normally this has been as a replacement for other more traditionally used materials because the polymeric material has attributes which lend it to performing the requirements of the task better. One simple and easy example of this is spectacle lenses, where polymeric materials have significantly eroded glass's previous dominance to the case now where more polymeric lenses exist than glass lenses.

Clearly, in order for the polymeric material to provide a true replacement for the traditional material it has to be capable of operating in the true fashion with all forms of additional materials, such as active materials like photochromic materials. With regard to polymeric materials and photochromic materials this is now technically possible, i.e. photochromic materials that are active in polymeric materials are known, and commercially available. However, the addition of the active material to the basic raw polymeric material can drastically increase the price of the material and therefore the final product. An example of this can be illustrated with the materials used for the production of certain types of spectacle lenses:

| | |
|---|---|
| Cost of basic raw polymer (for example Polycarbonate) | $2.50/lb |
| Cost of photochromic loaded Polymer (for example Polycarbonate) | $40.00/lb |

Now if identical spectacle lenses were made from the respective polymers above clearly approximately the same amounts of polymer would be used. Therefore the spectacle lens made from the photochromic Polycarbonate Polymer is 16 times more expensive to produce than that made from the basic raw polymer. This cost is obviously passed on to the customer.

Now the photochromic material perfectly illustrates the waste of material and increased production costs that can be saved.

With photochromic material in the polymeric material it is active between two different states. A first state or low energy state in which the material is clear, uncoloured and a second state or activated state in which the material is coloured. In order for the material to be activated from the first state to the second state actinic radiation is absorbed. Now with the polymeric materials in which the photochromic material is locked the actinic radiation does not penetrate the lens beyond a depth of above a few millimeters. Consequently only the first few millimeters of the lens will have activated photochromic material, therefore the rest of the photochromic material in the body of the lens is wasted, i.e. not used.

OBJECTS AND SUMMARY

The present invention is concerned with finding a method of manufacturing articles, such as spectacle lenses, which include active materials in a fashion which overcomes the above mentioned problem.

In accordance with the present invention there is provided a method of moulding an article which is formed from two or more layered sections and has a substantially homogenous formation, which article is made from thermoplastically behaving polymeric materials, the method uses a mould having interchangeable mould halves comprising

- forming a mould cavity from first and second mould halves;
- loading the mould cavity by injection with a charge of a first thermoplastic material which is at a temperature in excess of its glass transition temperature.
- curing or partially curing the first thermoplastic material so that an intermediate article is formed that corresponds in shape to the mould cavity;
- changing one of the mould halves, the second mould half, so as to define a subsequent mould cavity in which the cured or partially cured first thermoplastic material has a surface which is in contact with a surface of the first mould half;
- loading the subsequent mould cavity with a subsequent thermoplastic material which is compatible with the first thermoplastic material by injection into the subsequent mould cavity defined by the changed second mould half and the cured or partially cured first thermoplastic material; and
- curing the first and subsequent thermoplastic materials wherein at least one of the first and subsequent thermoplastic materials is loaded with an active photochromic material.

In the moulding operation the thermoplastic materials are in excess of their Glass Transition to flow and moulding therefore is possible.

The foregoing reference to changing the second mould half is used in a broad sense and refers to the fact the second mould half can be changed for a new mould half or simply moved in its location.

Further because the first thermoplastic material is at least partially cured prior to the injection of the second thermoplastic material into the mould cavity, the first thermoplastic material is formed into an intermediate shape which will substantially hold its shape.

Therefore articles moulded in accordance with the present invention have a layered sectional structure in which the layers are substantially distinct from one another, i.e. the differences in the compositions of the materials or their properties, are substantially maintained in localised areas but have a substantially homogeneous formation.

In view of the above it would clearly be expected that an article formed in accordance with the present invention would have a structure that is formed in distinct layered sections where a phase boundary would exist between the layered sections. However, for the sake of clarity it is pointed out that this is not the case. An article made in accordance with the present invention has a structure in which no discernible phase boundary exists between the individual adjacent layered sections of the article. Consequently, an article made in accordance with the present invention has a substantially homogenous formation.

It is believed that some form of very localised intermixing/between the two materials occurs at the boundary between the first and second materials. In this way a single phase is formed at the boundary and no distinct phase boundary will exist. Therefore, an article formed in accordance with the present invention will have layered sections but a substantially homogenous formation.

Due to the fact that an article made in accordance with the present invention has this substantially homogenous formation there is no, or relatively, no weakness in the article due to its structure. Consequently, the chance that separation will occur at the boundary between the two layers is significantly reduced.

The method in accordance with the present invention can be used in the manufacture of articles of the present invention in which a considerable number of layered sections are involved. It is not restricted to the manufacture of articles of the present invention having only two layers, although this is clearly possible.

Therefore, in a preferred embodiment of the present invention the method of manufacturing an article includes changing the mould half n−1 times where n is the number off layered sections in the article.

In one particular usage of the present invention the method of moulding is used to manufacture spectacle lenses with photochromic activity.

The active material that is loaded into one of the first or subsequent polymeric materials can De a material that has a particular function, and could perform for example any one of the following functions:

a photochromic material;

an ultra violet absorbing material; or a property modifier, for example, hardener, scratch resistance material, of the material.

In one particular arrangement of the present invention the active material is the polymeric material. In this way a polymeric material which has more appropriate properties for a particular function can be applied as, for example, a coating to the article.

Suitable thermoplastic materials for use with the present invention include polycarbonates, polyurethanes, methacrylates such as polymethyl methacrylate, styrene, poly esters Dicyclopenta diene and polymethylpentene.

The method of moulding in accordance with the present invention can be used to provide a main body of an article with thin layered section coatings.

For example, in the spectacle lens industry a number of the suitable optical materials used for the manufacture of the lenses are not generally acceptable with regard to wear resistance. That is to say they tend to scratch and, therefore, became optically unacceptable to the wearer. In some cases this scratching can simply occur on normal cleaning of lenses. Now with the method in accordance with the present invention thin layers of scratch resistant polymers can be formed at the two surfaces of a main optical body.

Further, with the advent of polymeric locked photochromics it is possible to significantly reduce the cost of these lenses, by forming the lens with only a layered section of photochromic which has the remainder of the lens formed from the basic polymer.

It should be noted layers formed in accordance with the present invention can be formed of uniform thickness, clearly this would in particular arrangements apply to the layer formed from the polymeric material loaded with the active photochromic material. Therefore, preferably the article formed in accordance with the method of moulding described herein, is formed so that the layer including the active material is of uniform thickness.

This means that an ophthalmic lens which has varying thickness can be formed so that the colouring effect, observed when exposed to actinic radiation when the lens incorporates photochromics is also uniform and this is a distinct advantage over what is presently available. Further with photochromic materials the forming of a multi layer article with more than one layer of adjacent photochromic loaded layers can produce some unique effects, where the combination off the layers appears to alter the colour produced on the activation off the photochromic.

In one particular example of the present invention the first and subsequent thermoplastic materials are essentially the same, however, at least one of the thermoplastic materials is loaded with a suitable active material.

It should be noted that more than one of the thermoplastic materials can be loaded with a suitable active material. Preferably, the first thermoplastic material is loaded with an active material.

In an alternative arrangement one of the subsequent thermoplastic materials is loaded with an active material.

In a second alternative both the first and the subsequent thermoplastic materials are loaded with an active material. This is useful when you have two active materials where the presence of one or other active materials interferes with the operation of the other active material. By using the method of manufacture of the present invention, the article can be manufactured in a fashion which means that the benefits of both of the active materials can be enjoyed and utilised.

BRIEF DESCRIPTION OF DRAWINGS

The invention will now be illustrated by way of description of an example, with reference to the accompanying drawings, in which.

DETAILED DESCRIPTION

Figure 1:
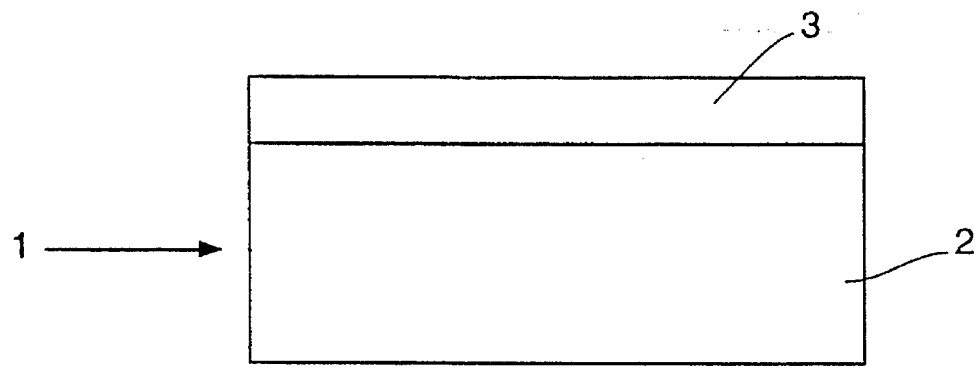
FIG. 1 shows a schematic partial diagram of an article made in accordance with the present invention.

Referring to FIG. 1 of the accompanying drawings there is schematically shown a first form of spectacle lens 1 which is made by the method of moulding of the present invention.

The lens represented in the schematic diagram of FIG. 1 comprises:

a layered section 2 which is in effect the main body section of the spectacle lens, and which is formed from a basic optical quality thermoplastic material, for example, a Polycarbonate; and a layered section 3 which is moulded over one surface, the front surface, of the layered section 2 and which comprises an optical quality thermoplastic material which is loaded with an active material such as a photochromic material and is of uniform thickness.

Figure 2:
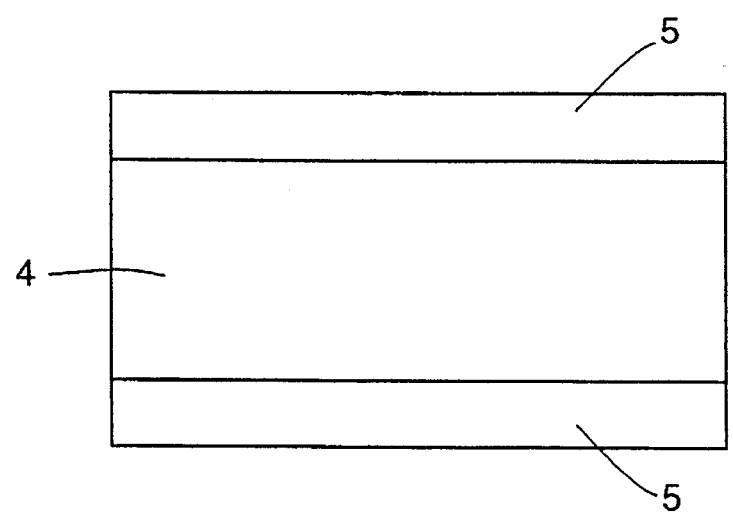
FIG. 2 shows a schematic partial diagram of a second article made in accordance with the present invention.

Now referring to FIG. 2 of the accompanying drawings there is schematically shown a second form of spectacle lens 1 which is made by the method of moulding of the present invention.

The lens represented in the schematic diagram of FIG. 2 is of sandwich like construction and comprises:

a central section 4 which is formed from an optical quality thermoplastic material; and two layered sections 5 formed from an optical quality thermoplastic material which contains an active material with each being of uniform thickness.

The two layered sections 5 are formed so that one of them covers the front surface of the central section 4 and the other covers the back surface of the central section 4. In this way the lens is formed in a sandwich type construction.

Figure 3:
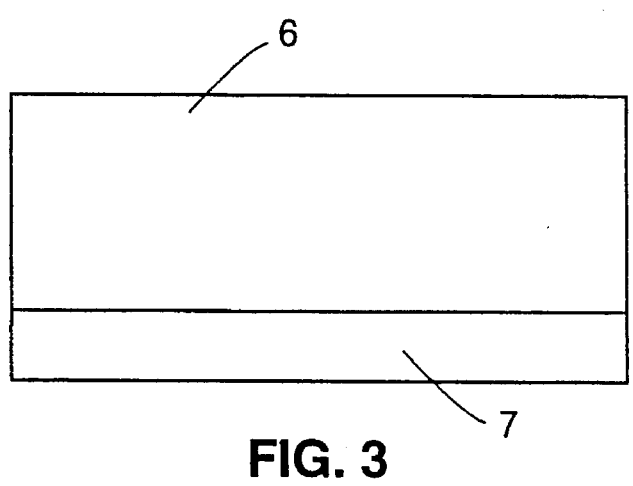
FIG. 3 shows a schematic partial diagram of a third article made in accordance with the present invention.
Figure 4:
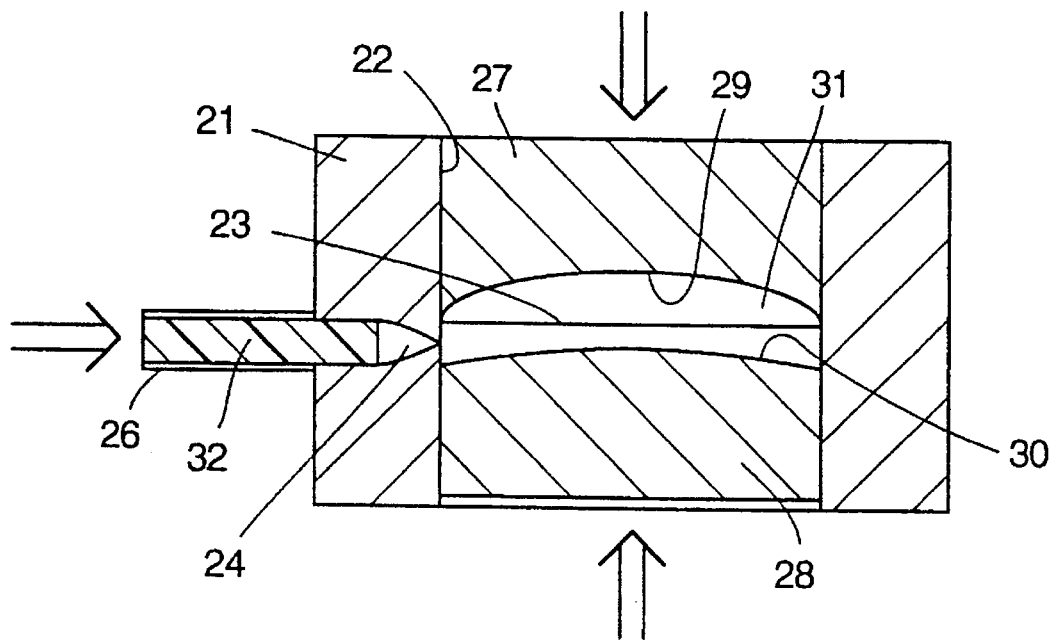
FIGS. 4–13 schematically show a method of moulding in accordance with the present invention.
Figure 5:
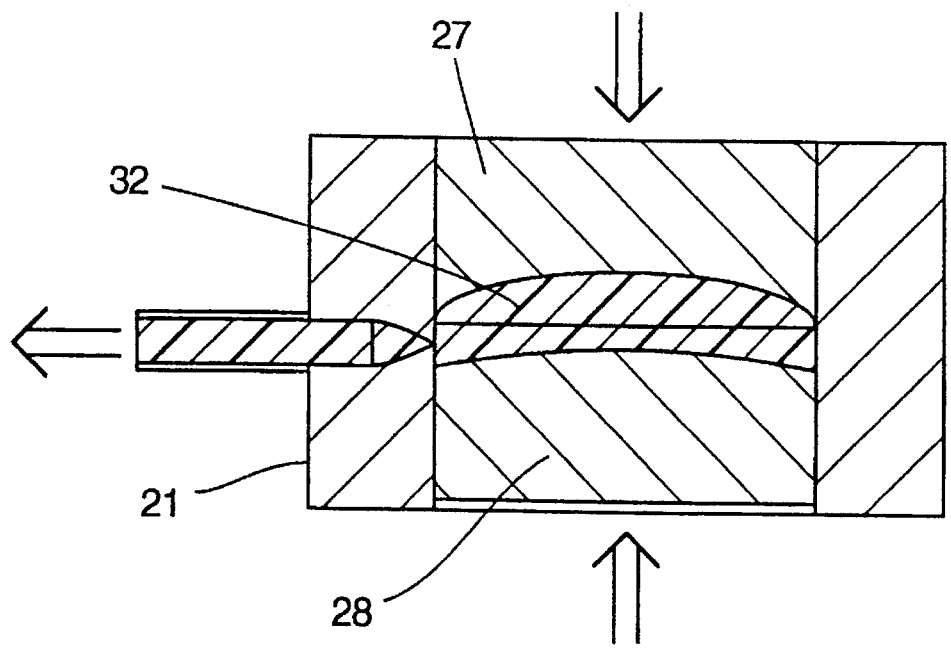
Figure 6:
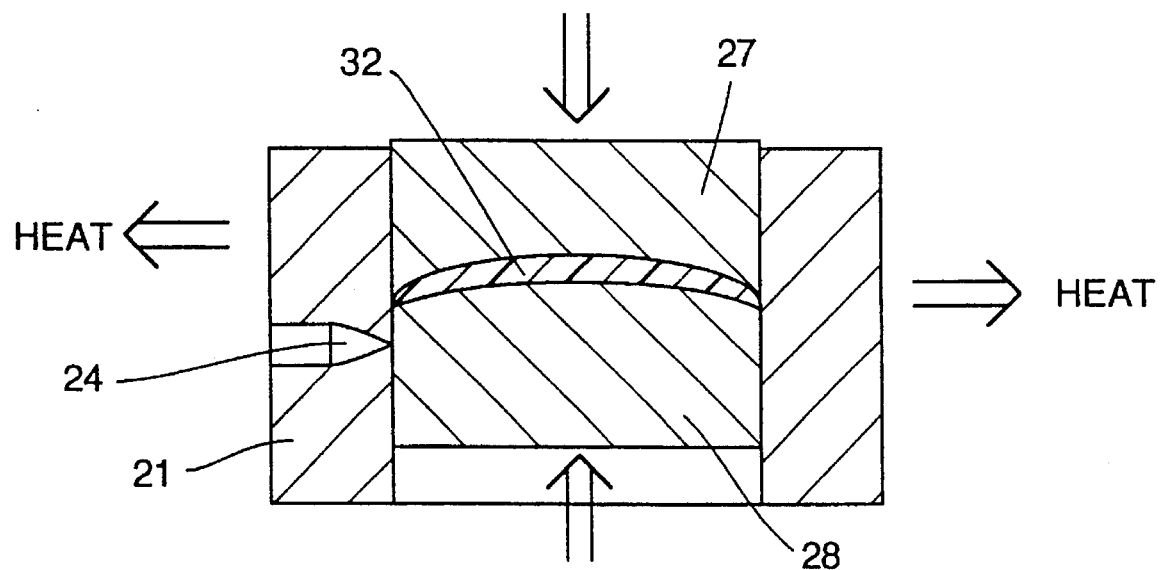
Figure 7:
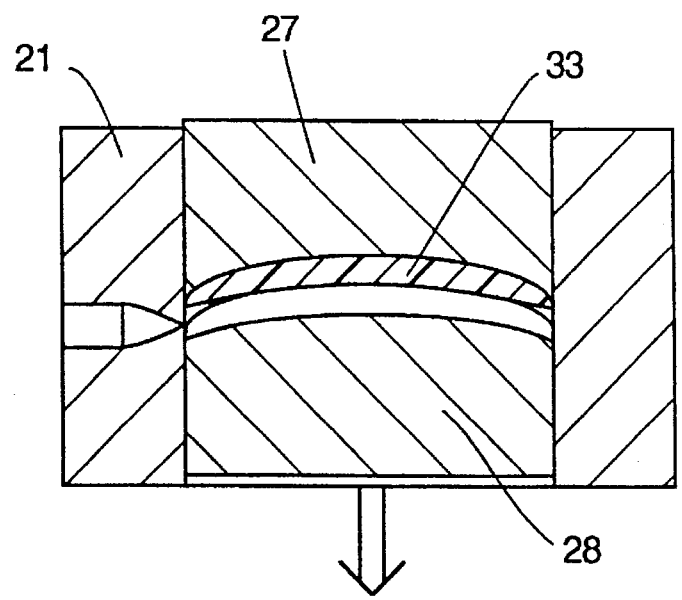
Figure 8:
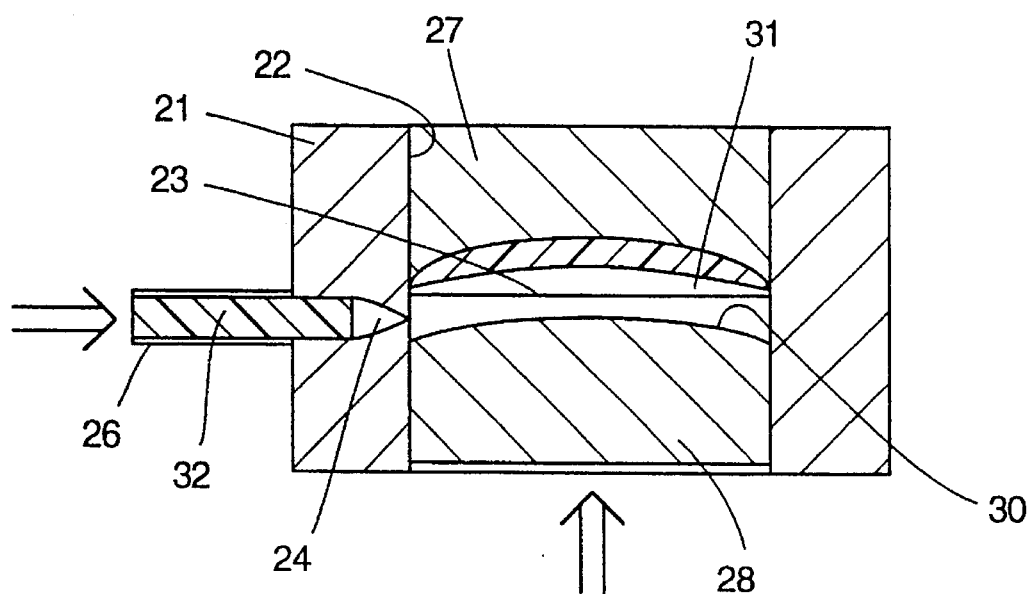
Figure 9:
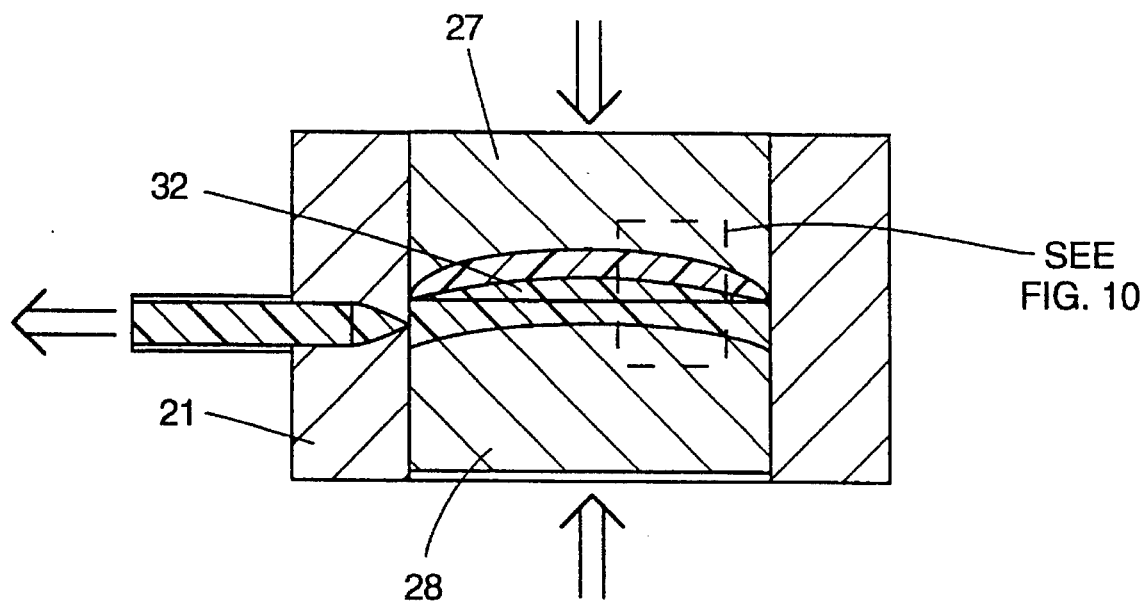
Figure 10:
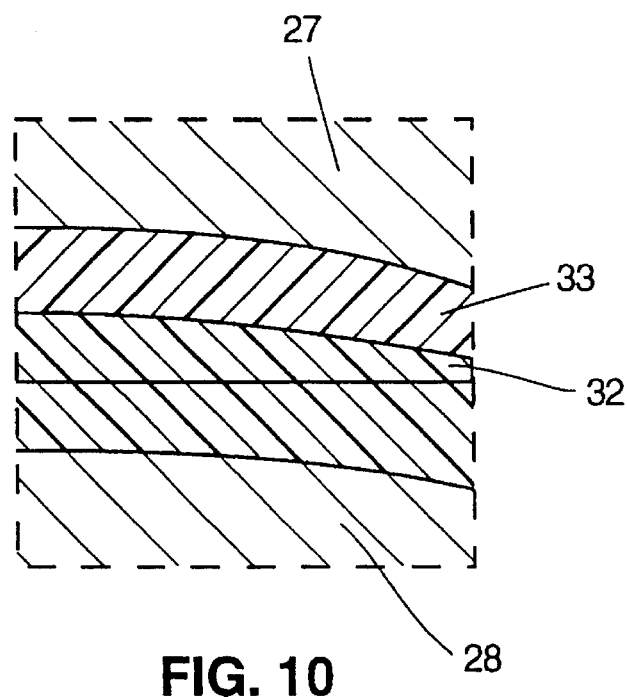
Figure 11:
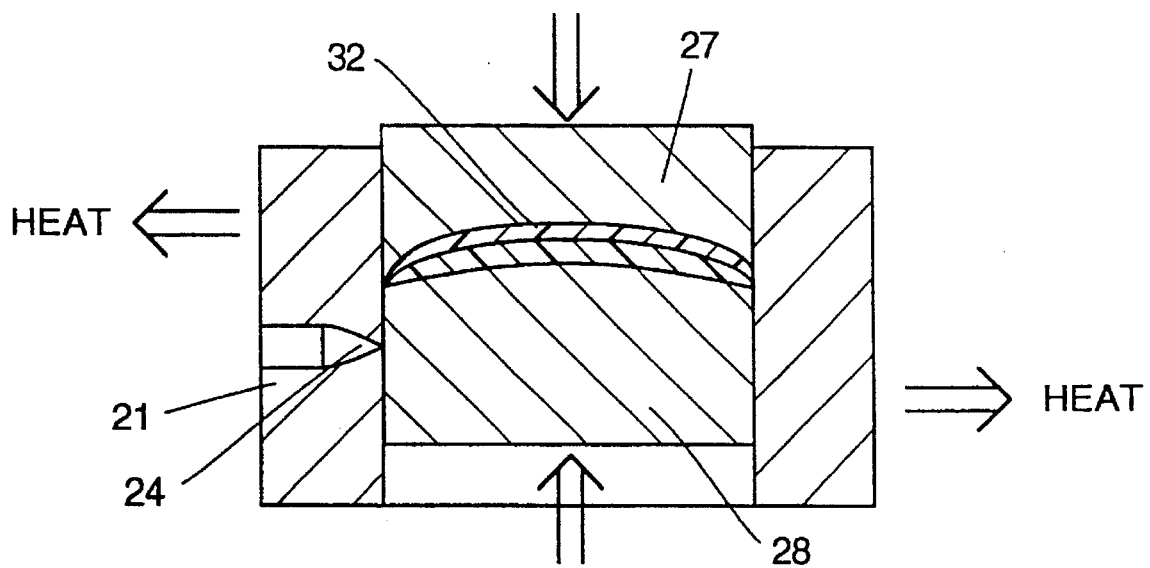
Figure 12:
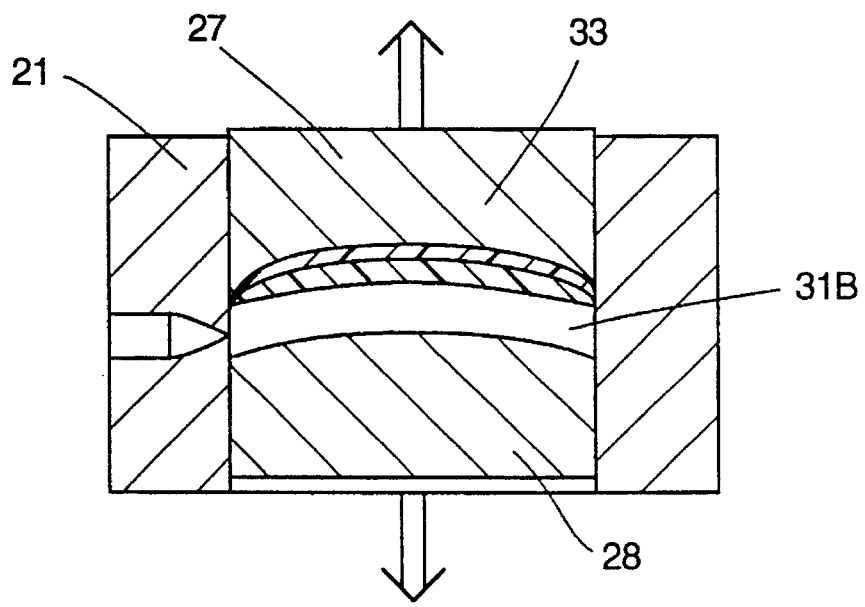
Figure 13:
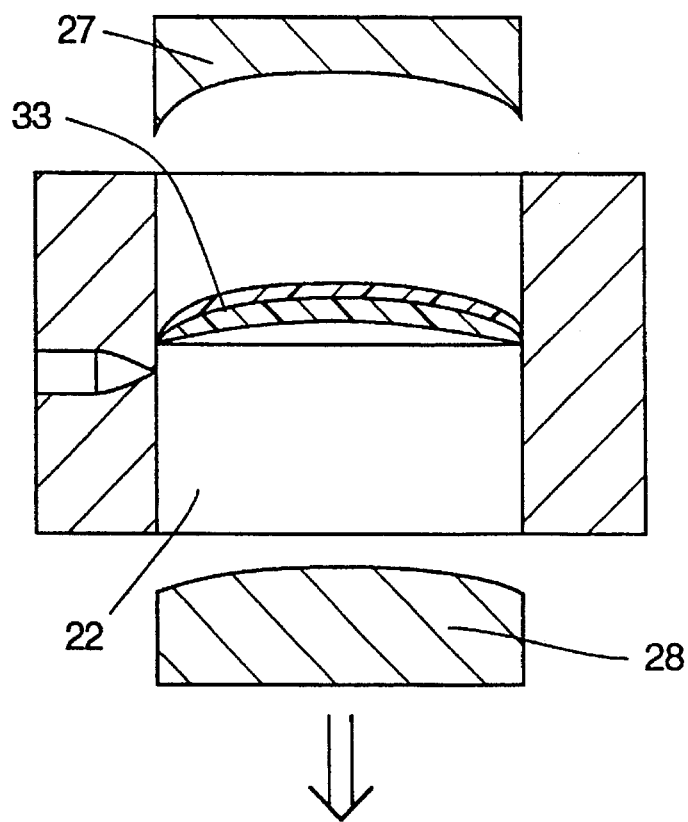

Now referring to FIG. 3 of the accompanying drawings there is schematically shown a third form of spectacle lens 1 made by the method of moulding of the present invention.

The lens represented in the schematic diagram of FIG. 3 comprises:

a layered section 6 which is in effect the main body of the spectacle lens and is formed from a basic optical quality thermoplastic material; and a layered section V which is moulded over one surface, the rear surface of the layered section 6 and which comprises an optically clear quality thermoplastic material which is loaded with an active material and is of uniform thickness.

Now referring to FIGS. 4 to 13 of the accompanying drawings, in which there is shown schematically a moulding operation which is operated in accordance with the method of the present invention.

The basic moulding operation which is to be disclosed below is described in full detail in the applicant's issued U.S. Pat. No. 4,836,960. Consequently, only brief details on the intricacies of the moulding operation will be given here.

The moulding operation is a combined injection/compression moulding process specifically intended for the production of ophthalmic lenses. The moulding operation involves the use of a device which has a sleeve 21 with a cylindrical bore 22 extending therethrough. An injection port 24 extends through the wall of the sleeve 21 to the bore 22 and the exterior end of this pore 24 is dimensioned and adapted so as to releasably engage an injector nipple 26 of a standard screw injector, the details of which will be known no the industry.

The bore 22 is also provided with an annular groove 23 spaced axially from the injection pore 24.

A pair of moulding dies 27 and 28 are also provided, the dies having cylindrical outer surfaces dimensioned to be received in the bore 22 with minimal clearance to allow sliding translation thereof in the bore. The die 27 is provided with a concave optical quality casting surface 29, and die 28 is provided with a convex optical quality casting surface 30. The die surfaces 29 and 30 when the dies are located in the sleeve 21 define a moulding cavity 31.

The dies 27 and 28 are heated to a temperature slightly above the glass transition temperature of the thermoplastic material being moulded. In the case of polycarbonate, the glass transition temperature $T_g$ is approximately 300° F., and the dies are heated to appoximately 400° F. The sleeve 21 is also beamed but to a temperature approximately 50° F. cooler than the dies, so that as the moulding operation is carried out, the injected material will cool and solidify at the outer annular boundary of the moulding cavity 31, and will not extrude into the narrow annular clearance space between the dies and the bore 22.

In the initial stages of the process, the heated dies are assembled in the bore of the heated sleeve 21, and the injector nipple 26 is engaged with the injector port 24. Thermoplastic material 32 heated to a viscous, flowable state is then injected under high pressure into the mold cavity 32 to fill the entire cavity.

Following plastic melt injection, the dies are translated together relative to each other. This step acts to reduce the thickness of the moulding cavity 31 to a desired dimension of the finished lens, and also to squeeze the thermoplastic material in the moulding cavity so that excess material is driven from the moulding cavity 31 out through the injector port, as shown in FIG. 2. It may be appreciated that the process is thus self-adjusting in the volume of plastic melt material consumed, so that plastic is not wasted.

Thereafter the mould dies 27 and 28 are translated conjointly axially in the bore relative to the sleeve, so that the moulding cavity 31 is effectively translated in the bore. This action has the effect of uncoupling the moulding cavity 31 from the injector port 24, as shown in FIG. 3, thereby sealing the moulding cavity 31 and preventing further ejection of plastic material from the moulding cavity. The moulding cavity 32 is shifted axially so that it is positioned to register with and incorporated the annular groove 23 therein, and the pressurized plastic melt will flow into the groove 23. At this stage the injector nipple 26 may be disengaged from the injector port 24.

Thereafter compressive pressure is applied to the dies. This compressive pressure is within the range of approximately 500–10,000 psi, and a pressure of 1000 psi is typical. The assembled mold dies and sleeve are then cooled, either passively by conduction and radiation, or by active cooling means such as cool air jets, conduction heat sinks, or the like.

As the assembly cools, the thermoplastic material loses heat and cools below the glass transition temperature, forming a solid article.

After the mould assembly cools the thermoplastic below $T_g$, and the plastic solidifies into an article 33, the compressive force is removed from the mould dies 27 and 28. A tensile force is then applied to separate the dies axially and pull one of the dies from the bore 22. Due to the fact that the article 33 extends into the annular groove 23, the article 33 is retained with one of the dies. The mould die which was removed from the assembly is now replaced with a new mould die, which means a new moulding cavity 31B is defined. The components of the assembly are returned to the appropriate temperature.

The injector nipple 26 is engaged again with the injector port 24. Thermoplastic material 32 containing an active material heated to viscous, flowable state is then injected under pressure into the moulding cavity 31B to fill the entire cavity.

Following plastic melt injection, the dies are translated together relative to each other. Thereafter the mould dies are translated conjointly axially in the bore relative to the sleeve so that the moulding cavity 31B is effectively translated in the bore. This action has the effect of uncoupling the moulding cavity 31B from the injector port 24, thereby sealing the mould cavity and preventing further ejection of plastic material from the mould cavity. The moulding cavity 31B is shifted axially so that it is positioned to register with and incorporated the annual groove 23 therein, and the pressurized plastic melt will flow into the groove 23. At this stage the injector nipple 26 may be disengaged from the injector port 23.

Thereafter compressive pressure is applied to the dies. The assembled mould dies and sleeve are then cooled, either passively by conduction and radiation, or by active cooling means such as cool air jets, conduction heat sinks or the like.

As the assembly cools, the thermoplastic material loses heat and cools below the glass transition temperature, forming a solid lens.

After the mould assembly cools the thermoplastic below $T_g$, and the plastic solidifies into a lens 33, the compressive force is removed from the mould dies. A tensile force is then applied to separate the dies axially and pull the dies from the bore 22. Due to the fact that the lens 33 extends into the annular groove 23, the lens 33 is retained at the location of its formation while the dies are separated from the lens and translated divergently outwardly from the bore. As the sleeve 21 and the lens 33 cool further, the thermal expansion off the bore and the contraction of the lens will cause the release of the lens from the annular groove 23, and the lens may easily be removed from the bore.

The method of moulding in accordance with the present invention has been illustrated in the above description with an article, a spectacle lens, which has two layers. However, the invention is not for use simply in the manufacture of two layers and no such limitation should be read into the description.

The method can simply be adapted for the production of articles with any number of layers. This is achieved by repeating the replacement/changing of the mould die to form a new mould cavity until the required number of layers have been formed in the article.

I claim:

1. A method of making a layered photochromic spectacle lens from thermoplastic material at least some of which is loaded with an active photochromic material, the method comprising:

introducing a thermoplastic material in a flowable state into a mould cavity defined by mould components;

cooling the thermoplastic material below the glass transition temperature so that one layer of the lens is formed;

separating one of the mould components from that one layer of the lens;

introducing a thermoplastic material in a flowable state into a second mould cavity defined by a mould component and the said one layer of the lens to establish a second layer of the lens; and cooling the thermoplastic material to form a photochromic ophthalmic substantially homogenous, layered product having no distinct phase boundary.

2. The method of claim 1 wherein one of the layers of the lens contains photochromic material and is formed of uniform thickness.

3. The method of claim 2 wherein, in addition to said layer of uniform thickness, other layers contain active materials selected from the group consisting of photochromic material, ultraviolet absorbing material, a hardener, and a scratch resistance material, are formed.

4. The method of claim 1 wherein more than one layer of adjacent, photochromic loaded layers are formed, and the combination of layers appears to alter the colour produced on the photochromic activation.

5. A method of manufacturing an article as claimed in claim 1 wherein said one layer and said second layer are substantially identical except for the presence of said active photochromic material in one of them.

6. A method of manufacturing an article as claimed in claim 1 wherein the second layer is loaded with said active photochromic material.

* * * * *